(12) United States Patent
Sterman et al.

(10) Patent No.: US 9,641,562 B2
(45) Date of Patent: May 2, 2017

(54) SYSTEMS AND METHODS OF MONITORING CALL QUALITY

(75) Inventors: Baruch Sterman, Efrat (IL); Tzahi Efrati, Givataim (IL); Yariv Trabelsi, Jerusalem (IL)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 13/340,438

(22) Filed: Dec. 29, 2011

(65) Prior Publication Data

US 2013/0171987 A1    Jul. 4, 2013

(51) Int. Cl.
*H04L 29/06* (2006.01)
*H04W 24/10* (2009.01)

(52) U.S. Cl.
CPC .......... *H04L 65/1083* (2013.01); *H04L 65/80* (2013.01); *H04W 24/10* (2013.01)

(58) Field of Classification Search
CPC ..... H04L 65/1083; H04L 65/80; H04W 24/10
USPC ............... 370/241, 252, 310, 328, 332, 351; 455/67.13; 704/223; 379/201.1
See application file for complete search history.

(56) References Cited

U.S. PATENT DOCUMENTS

| 7,664,122 | B1 * | 2/2010 | Cheung et al. | 370/401 |
|---|---|---|---|---|
| 2003/0133440 | A1 * | 7/2003 | Reynolds et al. | 370/352 |
| 2004/0208186 | A1 * | 10/2004 | Eichen et al. | 370/401 |
| 2004/0218546 | A1 * | 11/2004 | Clark | 370/252 |
| 2004/0264386 | A1 * | 12/2004 | Ha | 370/254 |
| 2005/0128955 | A1 * | 6/2005 | Chang | H04L 1/20 370/252 |
| 2005/0232309 | A1 * | 10/2005 | Kavaler | H04L 65/80 370/519 |
| 2006/0198360 | A1 | 9/2006 | Biage et al. | |
| 2007/0002732 | A1 * | 1/2007 | Batni et al. | 370/229 |
| 2007/0037570 | A1 * | 2/2007 | Donovan | H04W 24/08 455/423 |
| 2007/0171850 | A1 * | 7/2007 | Feder et al. | 370/311 |

(Continued)

FOREIGN PATENT DOCUMENTS

| WO | 03/081883 | 10/2003 |
|---|---|---|
| WO | 2008/040021 | 4/2008 |

OTHER PUBLICATIONS

International Search Report issued in PCT/US2012/071729 on Mar. 19, 2013.
Written Opinion issued in PCT/US2012/071729 on Mar. 19, 2013.

*Primary Examiner* — Brian D Nguyen
*Assistant Examiner* — Toan Nguyen
(74) *Attorney, Agent, or Firm* — Nixon & Vanderhye, P.C.; Joseph Pagnotta (57) ABSTRACT

When a voice over Internet protocol (VOIP) telephone call is being conducted by a mobile telephony device, measurements of at least one condition that exists for the mobile telephone device during the VOIP telephone call are taken during the duration of the telephone call. The measurements could be taken periodically as the VOIP telephone call progresses. The measured condition is one that could affect the perceived quality of the VOIP telephone call. The measurements of the at least one condition are recorded against the telephone call for later use and analysis. The recorded information may be analyzed to determine how to modify a setting of the mobile telephony device to improve the quality of VOIP telephone calls conducted with the mobile telephony device.

34 Claims, 4 Drawing Sheets

(56) References Cited

U.S. PATENT DOCUMENTS

| | | | |
|---|---|---|---|
| 2007/0223455 A1* | 9/2007 | Chang | H04M 7/0057 370/352 |
| 2007/0248022 A1* | 10/2007 | Kumar et al. | 370/252 |
| 2007/0280453 A1* | 12/2007 | Kelley et al. | 379/201.01 |
| 2009/0018826 A1* | 1/2009 | Berlin | 704/223 |
| 2009/0041016 A1* | 2/2009 | Bhal | 370/392 |
| 2010/0009674 A1* | 1/2010 | Sapkota et al. | 455/426.1 |
| 2010/0015926 A1* | 1/2010 | Luff | 455/67.13 |
| 2011/0134911 A1* | 6/2011 | Nilsson et al. | 370/352 |
| 2011/0149950 A1* | 6/2011 | Petit-Huguenin et al. | 370/352 |
| 2012/0020293 A1* | 1/2012 | Nix et al. | 370/328 |
| 2013/0028144 A1* | 1/2013 | Goodman et al. | 370/259 |

\* cited by examiner

SYSTEMS AND METHODS OF MONITORING CALL QUALITY

BACKGROUND OF THE INVENTION

The invention is related to Internet protocol (IP) telephony systems that allow users to place and receive telephone calls, and to send and receive text and video messages via data packets that are communicated over a data network.

When a call is established between an IP telephony device and an IP telephony system, the audio of the call is carried by data packets that traverse a data network. The speed at which the data packets are delivered, packet loss, jitter and various other data packet transmission statistics can affect the perceived call quality. For this reason, methods of monitoring and tracking data packet transmission statistics have been devised.

By monitoring data packet transmission statistics, an IP telephony system can predict call quality. If an IP telephony system knows that a first data transmission path does not typically have good data packet transmission statistics, which would indicate that call quality is likely to be poor, the IP telephony system can act to send data packets via an alternate path having better data packet transmission statistics.

More recently, IP telephony systems have been conducting IP based telephone calls with mobile telephony devices. The mobile telephony devices could include cells phones, and mobile computing devices which are capable of establishing a wireless data connection to a data network. While the same data packet transmission problems can also affect the quality of IP calls to such mobile telephony devices, the mobile telephony devices also have other sources of call quality problems unrelated to data packet transmissions.

For example, the voltage level or strength of the battery in a mobile telephony device can impact the perceived call quality. Likewise, background noise that is being picked up by the microphone of a mobile telephony device can impact call quality. Similarly, the setting of a microphone of a mobile telephony device can impact call quality. Further, if a mobile telephony device is communicating data packets bearing the call via a data channel provided by a cellular service provider, the signal strength of the cellular connection can impact call quality. Also, in some instances, the use of a hands-free speaker and microphone on a mobile device, which is now quite common, can impact call quality.

Presently, there is no way for an IP telephony system to acquire information about these additional sources of call quality problems that are encountered by mobile telephony devices. As a result, when a customer complains about the quality of calls conducted over a mobile telephony device, the customer service representatives of an IP telephony system will not know if the perceived call quality problems were the result of data packet transmission problems, or one of these alternate sources of call quality problems. Further, because it is impossible to collect information about these sources of call quality problems, it is difficult or impossible to provide useful advice to the caller about how call quality could be improved.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
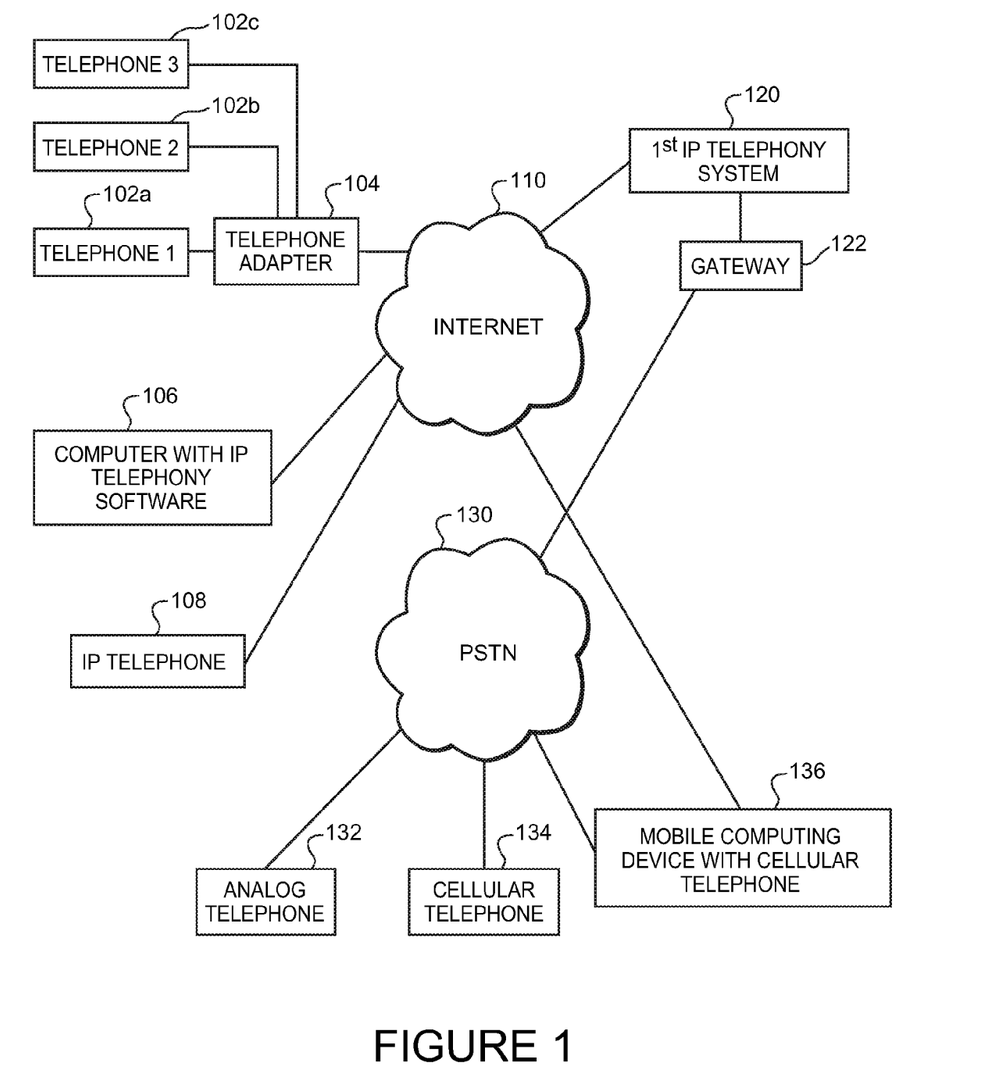
FIG. 1 is a diagram of a communications environment including various elements which are associated with an Internet protocol (IP) telephony system operating in accordance with the invention.

As illustrated in FIG. 1, a communications environment is provided to facilitate IP enhanced communications. An IP telephony system 120 enables connection of telephone calls between its own customers and other parties via data communications that pass over a data network. The data network is commonly the Internet 110, although the IP telephony system may also make use of private data networks. The IP telephony system 120 is connected to the Internet 110. In addition, the IP telephony system 120 is connected to a first publicly switched telephone network (PSTN) 130 via a gateway 122. The first PSTN 130 may also be directly coupled to the Internet 110 through one of its own internal gateways. Thus, communications may pass back and forth between the first IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a, 102b and 102c could all be coupled to the same telephone adaptor 104. Analog telephone devices include but are not limited to standard telephones and document imaging devices such as facsimile machines. A configuration using a telephone adapter 104 is common where all of the analog telephone devices 102a, 102b and 102c are located in a residence or business, and all of the telephone devices are connected to the same telephone adapter. With this type of a configuration, all of the analog telephone devices 102a, 102b, 102c share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 would then route the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the IP telephony system. A mobile computing device 136, as illustrated in FIG. 1, might connect to the PSTN 130 using its cellular telephone capabilities. However, such devices might also have the ability to connect to a data network, such as the Internet 110 wirelessly via some other means. For instance, a mobile computing device 136 might communicate with a wireless data router to connect the mobile computing device 136 directly to a data network, such as the Internet 110. In this instance, communications between the mobile computing device 136 and other parties could be entirely carried by data communications which pass from the mobile computing device 136 directly to a data network 110. Of course, alternate embodiments could utilize any other form of wireless communications path to enable communications.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

Figure 2:
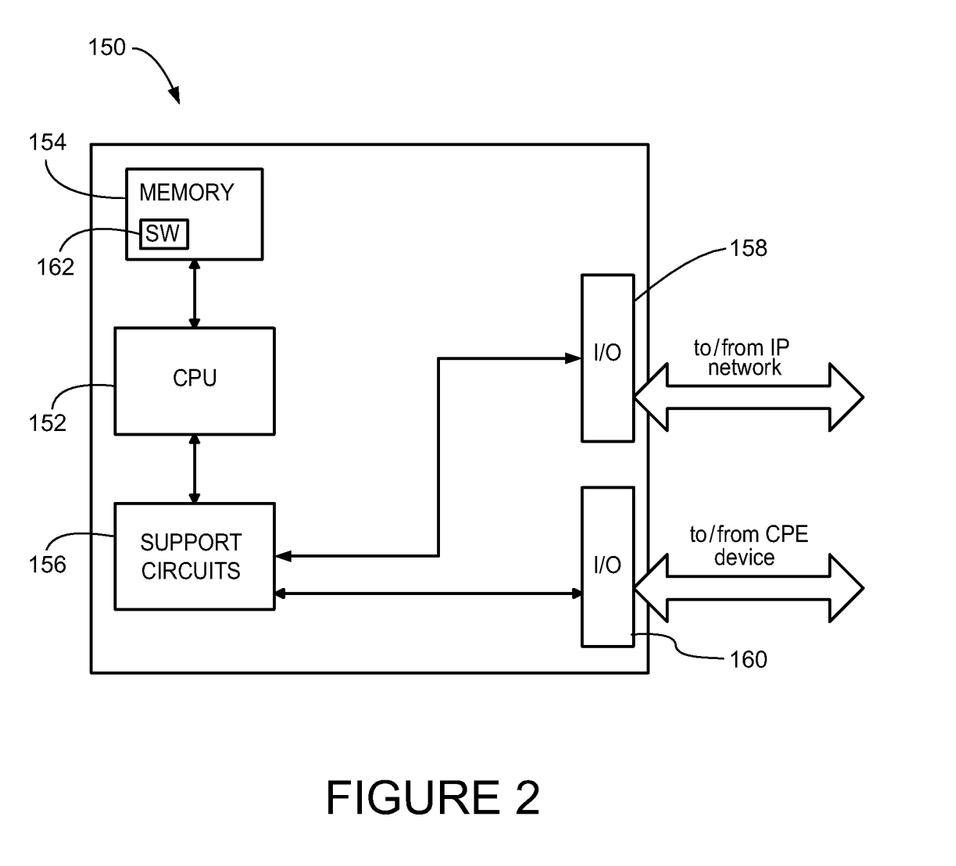
FIG. 2 is a diagram of various elements of a processor that forms part of an IP telephony system.

FIG. 2 illustrates elements of a computer processor 150 that can be used as part of the IP telephony system 120 to accomplish various functions. The IP telephony system 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is itself connected to a normal analog telephone, or some other type of device capable of communicating via data packets.

An IP telephony device could also be a cellular telephone or a portable computing device that runs a software application that enables the device to act as an IP telephone. Thus, a single device might be capable of operating as both a cellular telephone and an IP telephone. The following description also refers to mobile telephony devices. Mobile telephony devices are mobile devices such as cell phones and mobile computing devices like the Apple iPhone™ that are capable of establishing a wireless data link to a data network so that an IP telephone call can be conducted with the mobile telephony device via data packets passing over the data network.

Moreover, certain devices that are not traditionally used as telephony devices may act as telephony devices once they are configured with appropriate application software. Thus, some devices that would not normally be considered telephony devices may become telephony devices or IP telephony devices once they are running appropriate software.

As explained above, the conditions experienced by a mobile telephony device that is conducting a VOIP telephone call can give rise to call quality problems independent of data packet transmission issues. For example, the battery strength or voltage that exists during a VOIP telephone call could affect perceived call quality. If the strength of the battery is insufficient, or becomes insufficient during the duration of a call, call quality can suffer. The background noise level can also cause perceived call quality problems, both for the user of the mobile telephony device, and the party at the other end of the call. Similarly, a microphone setting of the mobile telephony device could impair call quality, particularly for the party at the other end of the call.

The signal strength of the wireless data connection that the mobile telephony device has established could also affect perceived call quality. This could be the strength of a signal that exists between the mobile telephony device and a wireless interface device that provides access to a data network, such as a WiFi or WiMax router. This could also be the strength of a signal that exists between the mobile telephony device and a transceiver of a cellular service provider that the mobile telephony device is using to access a data network.

In many instances, a mobile telephony device offers a user the ability to conduct a telephone call in a "hands-free" mode. This could include using a microphone and speaker on the mobile telephony device itself to conduct the call. In other instances, the mobile telephony device may be paired to a separate microphone and speaker that is used to conduct the call, either wirelessly or via a wired connection. If the user chooses to conduct the call using this type of hands-free functionality, call quality may be poor for the user himself, and/or for the party at the other end of the call.

In methods embodying the invention, information about the conditions that exist for a mobile telephony device during a VOIP telephone call are recorded against the call. This information can be used after the call has ended to determine why call quality was poor for a particular call. Also, this information can be analyzed during or after the call to determine if it is possible to take some type of action to improve call quality.

In some instances, measurements of one or more conditions experienced by the mobile telephony device are taken multiple times, periodically, during a call. The measurements themselves are then recorded along with an indication of the point in time that the measurements were made. This allows for a better or more detailed analysis of how measured conditions affected call quality.

When multiple measurements of one or more conditions are made during a call, the information can be analyzed and reported in multiple different ways. The measurements could be averaged to determine an average for each type of measurement for a particular call. Alternatively, a time graph could be created for a call to provide an indication of how a particular condition varied during the call. Also, it would be possible to calculate and report the maximum and minimum values for a condition during a particular call. Of course, other statistical analyses of the data could also be conducted, as is known to those skilled in the art.

The measurements of conditions could be stored on the mobile telephony device itself. One or more software applications on the device itself could then make use of the recorded information to inform the user of the device about how to improve call quality, or how to take corrective action.

Figure 3:
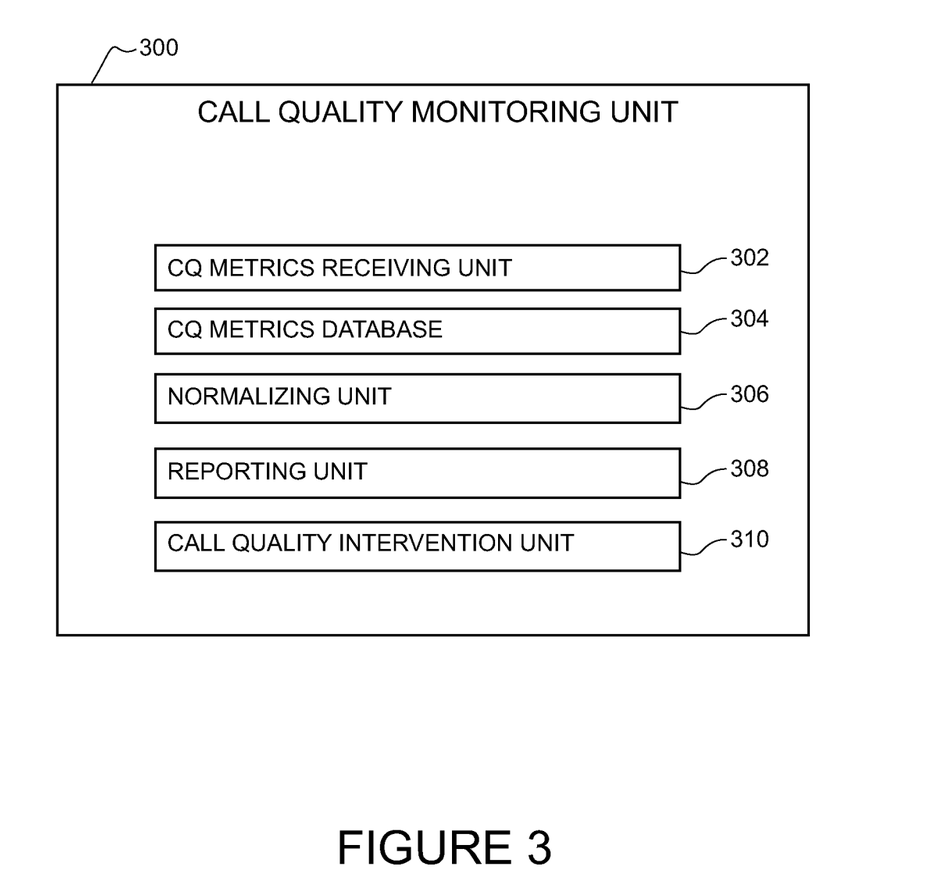
FIG. 3 is a block diagram of a call quality monitoring unit of an IP telephony system.

Alternatively, or in addition, the mobile device could report measured conditions to a call quality monitoring unit of an IP telephony system that is setting up and conducting the VOIP calls over the mobile telephony device. FIG. 3 illustrates one such call quality monitoring unit 300, which would be part of an IP telephony system 120, as illustrated in FIG. 1.

The call quality monitoring unit 300 includes a call quality metrics receiving unit 302 which receives measurements of conditions that exist for a mobile telephony device during a VOIP telephone call. As noted above, such measurements could be reported multiple times during a telephone call. Alternatively, a mobile telephony device might report multiple measurements taken during the duration of a VOIP telephone call only after the call has been terminated.

The measurements of conditions during a VOIP telephone call are then stored in a call quality metrics database 304. Each measurement or set of measurements for a particular call would be stored against that call in the database 304. In some embodiments, the measurements received by the call quality metrics receiving unit 302 are recorded as part of the call detail records (CDRs) that are generated for each call made through the IP telephony system. In other embodiments, a separate database of the received call quality measurements may be maintained by the call quality monitoring unit 300.

Some types of conditions that can be measured and reported by a mobile telephony device will vary in format from device to device. For example, the battery strength of a mobile telephony device could be reported by the device in different ways. One mobile telephony device could report a number from one to ten that is indicative of the strength of the battery. A second mobile telephony device would report the actual voltage of the battery at any given point in time. Yet a third type of mobile telephony device could report its battery strength as a percentage of the total talk time which is still available after a full charge.

Because different mobile telephony devices may report on the same condition affecting call quality in different formats, the call quality monitoring unit 300 may include a normalizing unit 306. The normalizing unit 306 receives information about measurements taken for the same type of condition from each of the various mobile telephony devices in their respective formats, and the normalizing unit generates corresponding measurement values under a common, normalized framework. Thus, the normalizing unit 306 is responsible for creating normalized measurement values for measurements that are reported by a mobile telephony device in a unique or unusual format.

When the normalizing unit 306 creates normalized measurements from the reported measurements, the normalized measurements would be stored in the call quality metrics database 304. In some instances, both the reported measurement values and the normalized measurement values would be stored. In other embodiments, only the normalized measurement values are stored.

The call quality monitoring unit 300 also includes a reporting unit 308. The reporting unit 308 is responsible for generating reports relating to recorded call quality metrics reported from mobile telephony devices. These reports may make it easier for quality correction personnel to spot trends, or to identify potential trouble. The reporting unit 308 may also provide an interface that allows customer service representatives to search the call quality metrics database 304 for information relating to particular telephone calls so that the customer service representatives can advise clients of why a particular call offered poor quality.

For example, if a customer calls to complain about the quality of a particular call, a customer service representative could access the call quality metrics database 304 to review the information that was recorded about conditions that existed on the customer's mobile telephony device during the call. This check could reveal that the battery of the customer's mobile telephony device was extremely low during the call, which would account for the poor call quality. Alternatively, the customer service representative might determine that the background noise that existed when the call was conducted was so high that call quality suffered. Other measurements reported by the mobile telephony device might also account for poor call quality. Because the customer service representative has access to this information, the customer service representative is able to advise the customer about steps that can be taken to improve call quality over the same mobile telephony device on future calls.

The call quality monitoring unit 300 also includes a call quality intervention unit 310. The call quality intervention unit 310 acts to inform users and/or the IP telephony system 120 about steps that can be taken to improve call quality. Also, in some embodiments, the call quality intervention unit may act to automatically adjust a setting on a mobile telephony device or aspects of the IP telephony system 120 to improve call quality.

The call quality intervention unit 310 analyzes data in the call quality metrics database 304 to determine if it is possible to improve call quality for a particular mobile telephony device. For example, the call quality intervention unit 310 may review information recorded in the call quality metrics database 304 for multiple calls placed over the same mobile telephony device over an extended period of time. After reviewing the recorded data, the call quality intervention unit 310 may note that whenever the mobile telephony device was used in a hands-free mode, call quality suffered. With this information, the call quality intervention unit 310 would then send a message to the user of the mobile telephony device to inform him of this fact and to recommend that calls not be conducted in hands-free mode if high call quality is desired. The message might also recommend that the user check the device(s) being used to conduct hands-free calls to determine if the devices are operating properly.

The call quality intervention unit 310 could conduct a large number of different analyses of the data stored in the call quality metrics database 304 to provide a large number of different recommendations to the user of a mobile telephony device about how to act to improve call quality. Also, the call quality intervention unit might provide information to the IP telephony system 120 about how to improve call quality for individual mobile telephony devices due to their particular characteristics. Similarly, the call quality intervention unit 310 might provide information to the IP telephony system 120 about how to better interact with a particular type of mobile telephony device, based on an analysis of measurements provided by multiple ones of that type of mobile telephony device.

In some instances, the call quality intervention unit 310 may proactively act to improve call quality on a particular mobile telephony device. For example, if an analysis of reported data from one or more calls conducted by a mobile telephony device indicates that the mobile telephony device is using an improper microphone setting, the call quality intervention unit 310 may be capable of adjusting the microphone setting of the mobile telephony device via communications with the mobile telephony device. In some instances, the call quality intervention unit 310 may ask for permission from the user before making the adjustment. In other instances, the change might be made automatically, without user intervention or approval.

In a similar fashion, the call quality intervention unit 310 may act to automatically adjust how the IP telephony system 120 interacts with a particular mobile telephony device, or a particular type of mobile telephony device, in an attempt to improve call quality on those devices.

In the preceding discussion, it was assumed that the call quality monitoring unit 300 was a part of the IP telephony system 120. In alternate embodiments, one or more software applications running on a mobile telephony device may perform all or some of the functions of the call quality monitoring unit 300. Thus, the call quality monitoring unit 300 may be a part of the mobile telephony device itself.

Figure 4:
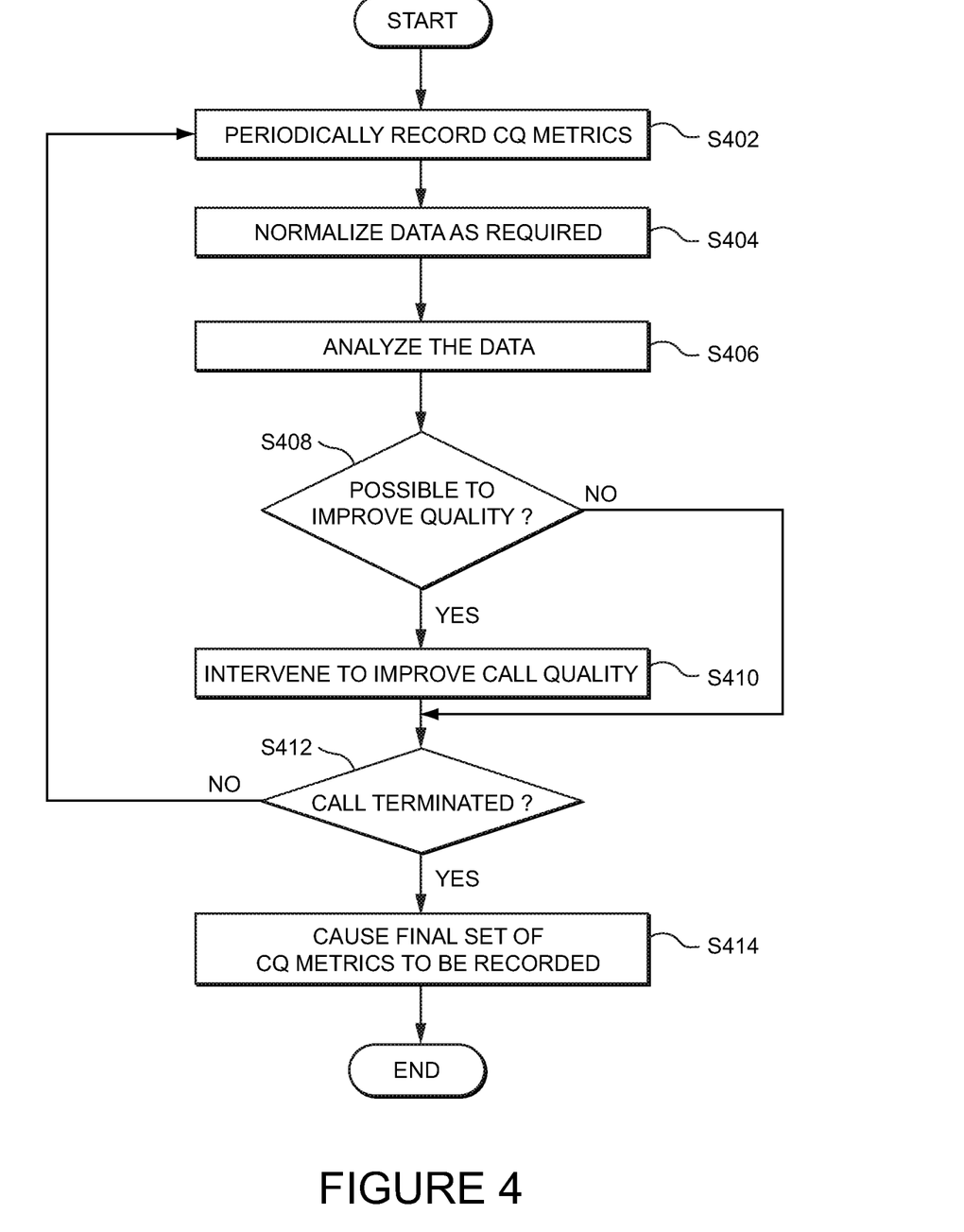
FIG. 4 is a diagram of steps of a method embodying the invention in which call quality information is collected and used to improve the quality of calls over an IP telephony system.

FIG. 4 illustrates steps of a method embodying the invention. This method could be performed by a call quality monitoring unit 300 that is part of an IP telephony system 120. Alternatively, the method could be performed by a software application running on a mobile telephony device.

The method begins in step S402, when call quality metrics information is periodically recorded during a call. As explained above, the call quality information could relate to any one of multiple conditions that are being experienced by a mobile telephony device during a VOIP telephone call. A single measurement of a particular condition might be obtained. Alternatively, multiple measurements of the same condition could be taken periodically as a call proceeds. Further a single or multiple measurements of multiple different conditions could be taken during a call.

In step S404, measurements that require normalization are converted into normalized measurement values. This step is optional.

In step S406, the recorded data is analyzed. The analysis step could occur while the call is progressing. Alternatively, the analysis step could occur only after a call has been completed. In some embodiments, the analysis may be performed in a batch format at various times. Also, in some instances, it may make sense to accumulate data about a particular condition from a large number of calls before the data is analyzed for trends.

In step S408, a decision is made, using the results of the analysis step, to determine if it is possible to act to improve call quality on an individual device, or on a class of mobile telephony devices. If so, the method proceeds to step S410, and the desired action is taken. As explained above, this could include informing a user about how to act to improve call quality on his mobile telephony device. This step could also include proactively making a change to the user's mobile telephony device or to the IP telephony system 120 to improve call quality.

In step S412 a check is performed to determine if the call has been terminated by either party. If not, the method proceeds back to step S402. If so, the method proceeds to step S414, and a final set of call quality metrics for the call are recorded. In instances where the method is being performed by a call quality monitoring unit 300 of an IP telephony system 120, this step could include recording measurements taken during a telephone call in the call quality metrics database 304 after the call is terminated. If the method is being performed by a mobile telephony device, this step could include sending a full set of measurements recorded during a call to a call quality monitoring unit 300 after the call has been completed.

In the method described above, an analysis of condition measurements is performed while a call is proceeding, and steps may be taken to improve call quality while the call is still being conducted. In alternate methods, the analysis and intervention to improve call quality might be conducted only after the call has been terminated.

In the foregoing examples, it was assumed that conditions experienced by a mobile telephony device during one or more VOIP telephone calls would be reported to a call quality monitoring unit 300 of an IP telephony system 120. The call quality monitoring unit 300 would store the measurements for each call in databases for later use and analysis. The same procedures could also be performed for telephony devices other than mobile telephony devices. For example, the same procedures could be used to record conditions that exist for IP telephones, mobile computing devices with IP telephony software, analog telephones that act through an IP telephony adaptor, and for other types of telephony devices. Any of these telephony devices could report conditions that potentially affect call quality, and this information could be stored against the telephone calls for later use and analysis. Thus, the descriptions given above should not be taken as an indication that systems and methods embodying the invention only apply to mobile telephony devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of monitoring and recording call quality metrics for Internet protocol (IP)-based communications conducted by a mobile telephony device that natively conducts non-IP-based communications via a first telephony service provider, the method comprising:
   receiving call quality information from the mobile telephony device, that natively conducts non-IP-based communications via the first telephony service provider, indicative of at least one condition related to an operating state of the mobile telephony device during a voice over Internet protocol (VOIP) telephone call conducted via a second telephony service provider non-native to the mobile telephony device;
   normalizing the call quality information received from the mobile telephony device; and
   recording, at the second telephony service provider, the normalized call quality information and the received call quality information related to at least the operating state of the mobile telephony device against the VOIP telephone call to monitor call quality metrics of VOIP telephone calls conducted by the mobile telephony device via the second telephony service provider.

2. The method of claim 1, wherein the call quality information comprises information about a strength or voltage level of a battery of the mobile telephony device during the VOIP telephone call.

3. The method of claim 1, wherein the call quality information comprises information about a background noise level that was present for the mobile telephony device during the VOIP telephone call.

4. The method of claim 1, wherein the call quality information comprises information about a strength of a wireless data connection that the mobile telephony device used to conduct the VOIP telephone call.

5. The method of claim 4, wherein the call quality information comprises information about a signal strength that existed between the mobile telephony device and a wireless interface that the mobile telephony device used to access a data network during the VOIP telephone call.

6. The method of claim 4, wherein the call quality information comprises information about a signal strength that existed between the mobile telephony device and a transceiver of a cellular service provider that the mobile telephone device used to communicate data during the VOIP telephone call.

7. The method of claim 1, wherein the call quality information comprises a microphone setting of the mobile telephony device during the VOIP telephone call.

8. The method of claim 1, wherein the call quality information comprises information about whether the user conducted the VOIP telephone call using a hands-free function provided by the mobile telephony device.

9. The method of claim 1, wherein the call quality information is independent of data packet transmission measurements.

10. The method of claim 1, wherein said receiving comprises receiving the call quality information periodically during the VOIP telephone call.

11. The method of claim 1, wherein said receiving comprises receiving multiple measures of a single type of call quality information that were detected periodically during the VOIP telephone call, and wherein said recording comprises recording the each of the received measures against the point in time during the VOIP telephone call at which they were detected.

12. The method of claim 1, wherein the received call quality information is normalized against a standardized frame of reference.

13. The method of claim 1, further comprising:
   analyzing the received call quality information to determine if the quality of VOIP telephone calls conducted over the mobile telephony device could likely be improved by taking a first type of action; and
   sending information about the first type of action to the user of the mobile telephony device.

14. The method of claim 13, wherein said receiving, analyzing and sending are conducted during the VOIP telephone call so that the user of the mobile telephony device is informed about the first type of action during the VOIP telephone call.

15. The method of claim 1, further comprising:
   analyzing the received call quality information to determine if the quality of VOIP telephone calls conducted over the mobile telephony device could likely be improved by modifying a setting of the mobile telephony device; and
   causing the setting of the mobile telephony device to be modified to improve the quality of VOIP telephone calls conducted over the mobile telephony device.

16. The method of claim 15, wherein said causing is conducted automatically and without user intervention.

17. The method of claim 1, wherein the second telephony service provider includes a call quality intervention unit configured to inform users and/or the second telephony service provider about steps that can be taken to improve call quality.

18. The method of claim 1, wherein the second telephony service provider includes a call quality intervention unit configured to automatically adjust a setting on the mobile telephony device and/or aspects of the second telephony service provider to improve call quality.

19. The method of claim 1, further comprising creating a normalized measurement value for the normalized call quality information for measurements that are reported by a mobile telephony device in a unique format.

20. A system for monitoring and recording call quality metrics for Internet protocol (IP)-based communications conducted by a mobile telephony device that natively conducts non-IP-based communications via a first telephony service provider, comprising:
means for receiving call quality information from the mobile telephony device, that natively conducts non-IP-based communications via the first telephony service provider, indicative of at least one condition related to an operating state of the mobile telephony device during a voice over Internet protocol (VOIP) telephone call conducted via a second telephony service provider non-native to the mobile telephony device;
means for normalizing the call quality information received from the mobile telephony device; and
means for recording, at the second telephony service provider, the normalized call quality information and the received call quality information related to at least the operating state of the mobile telephony device against the VOIP telephone call to monitor call quality metrics of VOIP telephone calls conducted by the mobile telephony device via the second telephony service provider.

21. A system for monitoring and recording call quality metrics for Internet protocol (IP)-based communications conducted by a mobile telephony device that natively conducts non-IP-based communications via a first telephony service provider, comprising:
a receiving unit that receives call quality information from the mobile telephony device, that natively conducts non-IP-based communications via the first telephony service provider, indicative of at least one condition related to an operating state of the mobile telephony device during a voice over Internet protocol (VOIP) telephone call conducted via a second telephony service provider non-native to the mobile telephony device;
a normalizing unit that normalizes the call quality information received from the mobile telephony device; and
a quality metrics database unit that records, at the second telephony service provider, the normalized call quality information and the received call quality information related to at least the operating state of the mobile telephony device against the VOIP telephone call to monitor call quality metrics of VOIP telephone calls conducted by the mobile telephony device via the second telephony service provider.

22. The system of claim 21, wherein the receiving unit receives information about a strength or voltage level of a battery of the mobile telephony device during the VOIP telephone call.

23. The system of claim 21, wherein the receiving unit receives information about a background noise level that was present for the mobile telephony device during the VOIP telephone call.

24. The system of claim 21, wherein the receiving unit receives information about a strength of a wireless data connection that the mobile telephony device used to conduct the VOIP telephone call.

25. The system of claim 24, wherein the receiving unit receives information about a signal strength that existed between the mobile telephony device and a wireless interface that the mobile telephony device used to access a data network during the VOIP telephone call.

26. The system of claim 24, wherein the receiving unit receives information about a signal strength that existed between the mobile telephony device and a transceiver of a cellular service provider that the mobile telephone device used to communicate data during the VOIP telephone call.

27. The system of claim 21, wherein the receiving unit receives information about a microphone setting of the mobile telephony device during the VOIP telephone call.

28. The system of claim 21, wherein the receiving unit receives information about whether the user conducted the VOIP telephone call using a hands-free function provided by the mobile telephony device.

29. The system of claim 21, wherein the call quality information is independent of data packet transmission measurements.

30. The system of claim 21, wherein the receiving unit receives the call quality information periodically during the VOIP telephone call.

31. The system of claim 21, wherein the receiving unit receives multiple measures of a single type of call quality information that were detected periodically during the VOIP telephone call, and wherein the database unit records each of the received measures against the point in time during the VOIP telephone call at which they were detected.

32. The system of claim 21, wherein the normalizing unit normalizes the received call quality information against a standardized frame of reference.

33. The system of claim 21, further comprising:
an analyzing unit that analyzes the received call quality information to determine if the quality of VOIP telephone calls conducted over the mobile telephony device could likely be improved by taking a first type of action; and
a reporting unit that sends information about the first type of action to the user of the mobile telephony device.

34. The system of claim 21, further comprising:
an analyzing unit that analyzes the received call quality information to determine if the quality of VOIP telephone calls conducted over the mobile telephony device could likely be improved by modifying a setting of the mobile telephony device; and
a setting unit that causes the setting of the mobile telephony device to be modified to improve the quality of VOIP telephone calls conducted over the mobile telephony device.

* * * * *